United States Patent
Noda

(10) Patent No.: US 7,679,353 B2
(45) Date of Patent: Mar. 16, 2010

(54) CONSTANT-CURRENT CIRCUIT AND LIGHT-EMITTING DIODE DRIVE DEVICE THEREWITH

(75) Inventor: Ippei Noda, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/007,955

(22) Filed: Jan. 17, 2008

(65) Prior Publication Data

US 2008/0174253 A1 Jul. 24, 2008

(30) Foreign Application Priority Data

Jan. 18, 2007 (JP) .............................. 2007-008929

(51) Int. Cl.
*G05F 3/16* (2006.01)
*G05F 1/10* (2006.01)

(52) U.S. Cl. ....................... 323/315; 323/316; 323/312; 323/304; 327/538; 327/540; 327/543; 327/530

(58) Field of Classification Search ................ 323/315, 323/316, 313, 314, 312, 311, 304; 327/538, 327/540–543, 66–68, 490, 483–489; 315/291–311
See application file for complete search history.

(56) References Cited

U.S. PATENT DOCUMENTS

| 6,268,772 | B1 * | 7/2001 | Chen ........................... 330/288 |
| 6,424,131 | B1 * | 7/2002 | Yamamoto et al. .......... 323/282 |
| 6,633,198 | B2 * | 10/2003 | Spalding, Jr. ............... 327/538 |
| 7,142,044 | B2 * | 11/2006 | Sano ........................... 327/540 |
| 7,202,711 | B2 * | 4/2007 | Gose et al. .................. 327/108 |

FOREIGN PATENT DOCUMENTS

| JP | 09-319323 | 12/1997 |
| JP | 2004-180007 | 6/2004 |

* cited by examiner

*Primary Examiner*—Tuyet Vo
(74) *Attorney, Agent, or Firm*—Dickstein Shapiro LLP

(57) ABSTRACT

A constant-current circuit includes a first transistor for supplying a current based on a control signal input to a gate of the first transistor so as to serve as a current source, a second transistor for supplying a current to a load based on the control signal input to a gate of the second transistor, a voltage regulation unit for controlling a drain voltage of the first transistor according to a drain voltage of the second transistor, a current detector for detecting a value of a current flowing through the first transistor and output a current according to the detected value, and a controller for controlling each gate voltage of the first and second transistors according to the value detected by the current detector so that the current flowing through the first transistor becomes a predetermined value. The first and second transistors are MOS transistors having the same conductivity.

20 Claims, 5 Drawing Sheets

CONSTANT-CURRENT CIRCUIT AND LIGHT-EMITTING DIODE DRIVE DEVICE THEREWITH

CROSS-REFERENCE TO RELATED APPLICATION

The present patent application claims priority under 35 U.S.C. §119 from Japanese Patent Application No. 2007-008929, filed on Jan. 18, 2007 in the Japan Patent Office, the entire contents and disclosure of which are hereby incorporated by reference herein.

BACKGROUND OF THE INVENTION

1. Field of the Invention

Preferred embodiments of the present invention generally relate to a constant-current circuit, and more particularly, to a light-emitting diode drive device using a constant-current circuit for outputting a constant current with high precision and reducing power consumption of the constant-current circuit by lowering an output voltage while maintaining the high precision in outputting the constant current.

2. Discussion of the Related Art

In general, in order to reduce uneven brightness, a light-emitting diode (LED) used for a display device is driven by a constant-current circuit. The constant-current circuit employs an electrode of a drain of a MOS transistor as an output terminal. When a voltage of the output terminal varies greatly, an output current also fluctuates due to a channel-length modulation effect of the MOS transistor. As a result, the brightness of the LED becomes irregular.

So far, several techniques have been proposed for outputting a constant current with high precision. For example, FIG. 7 shows a conventional constant-current circuit. In FIG. 7, NMOS transistors M111, M112, M141, and M142 form a low-voltage cascode-type current mirror circuit, and the constant-current circuit outputs an output current $i_{out}$ that is obtained by multiplying a current $i_{ref1}$ by a ratio of transistor sizes of the NMOS transistors M111 and M112 to an external load 110 connected to an output terminal OUT. An error amplifier OP102 controls an NMOS transistor M116 such that a voltage of a connection point between a resistor R111 and the NMOS transistor M116 becomes a reference voltage Vref. When a value of the resistor R111 is r111, a current $i_{ref2}$ flowing through the resistor R111 is Vref/r111. The current $i_{ref2}$ becomes the current $i_{ref1}$ by being reflexed at PMOS transistors M115 and M114 forming a current mirror circuit.

Since the NMOS transistors M111, M112, M141, and M142 that serve as an output circuit for supplying the output current $i_{out}$ to the external load 110 form the cascode-type current mirror circuit, voltage fluctuation at the output terminal OUT hardly affects the output current $i_{out}$. However, when an output transistor for supplying the output current $i_{out}$ to the output terminal OUT is formed by connecting the NMOS transistors M112 and M142 in series, even if the output circuit is formed of the low-voltage cascode-type current mirror circuit, the voltage at the output terminal OUT that is required for the output transistor to operate in a saturation region, which enables the output transistor to maintain high precision in outputting a constant current, becomes high.

More specifically, provided that the NMOS transistors M111, M112, M141, and M142 have the same transistor size and the same conductivity, a voltage Vds1 between a drain and a source of the NMOS transistor M112 is represented in the following equation (a), in which a threshold voltage, a voltage between a gate and a source of the NMOS transistor M142, an overdrive voltage, and a bias voltage generated by a bias voltage generator 108 are represented as Vthn, Vgs2, Vov, and Vbias, respectively:

$$Vds1 = Vbias - Vgs2 \quad (a)$$

When the bias voltage Vbias is set to a value satisfying an equation Vbias=Vgs2+Vov, such that the NMOS transistor M112 operates in a boundary region between linear and saturation regions, the above equation (a) turns to the following equation (b):

$$Vds1 = Vov \quad (b)$$

When the NMOS transistor M142 also operates in the boundary region between the linear and saturation regions as well as the NMOS transistor M112, the voltage Vds2 between a drain and a source of the NMOS transistor M142 is represented by the following equation (c):

$$Vds2 = Vov \quad (c)$$

Hence, a minimum voltage Vomin of the output terminal OUT is represented in the following equation (d):

$$Vomin = Vds1 + Vds2 = 2 \times Vov \quad (d)$$

At this point, several problems arise. When the voltage output from the output terminal OUT increases, power consumed at the output transistor in the constant-current circuit also increases. At the same time, when the output transistor is formed by connecting two MOS transistors in series, a chip area substantially increases, as a size of the output transistor for high-current output is extremely large. Furthermore, in the constant-current circuit shown in FIG. 7, a voltage between a drain and a source of the NMOS transistor M141 is constant, whereas the voltage Vds2 between the drain and the source of the NMOS transistor M142 fluctuates according to the external load 110. Thus, the voltages between the drain and the source of the NMOS transistors M141 and M142 are different, and the voltages between the gate and the source of the NMOS transistors M141 and M142 are also different. As a result, the voltages between the drain and the source of the NMOS transistors M111 and M112 are different as well, and systemic error in outputting the output current $i_{out}$ may be generated.

In order to solve the above-described problems, for example, another technique has been proposed as shown in FIG. 8. A constant-current circuit shown in FIG. 8 outputs a constant output current even when an external load connected to an output terminal OUT of the constant-current circuit varies and stably operates in a saturation region even when a voltage output from the output terminal OUT is small. In the constant-current circuit, provided that a variable resistor R is appropriately adjusted, voltages between a drain and a source of each of NMOS transistors NT1 and NT2 become equal without connecting the NMOS transistors NT1 and NT2 so as to form a cascode-type current mirror circuit. As a result, the constant-current circuit can output a constant current with high precision without systemic error.

However, such a technique has a drawback in that the voltage between the drain and the source of the NMOS transistor NT2 is controlled only in a limited range. A range of a voltage Vo output from the output terminal OUT that enables the constant-current circuit shown in FIG. 8 to output the constant current without the systemic error is represented in the following equation, in which a threshold voltage of the NMOS transistor NT2 and an overdrive voltage are represented as Vthn and Vov2, respectively:

$$Vov2 \leq Vo \leq Vthn+Vov2$$

Accordingly, a variable range of the voltage Vo is extremely limited.

SUMMARY OF THE INVENTION

The present invention describes a novel constant-current circuit. In one preferred embodiment, a constant-current circuit includes a first transistor formed of a MOS transistor and configured to supply a current based on a control signal input to a gate of the first transistor so as to serve as a current source, a second transistor formed of a MOS transistor having the same conductivity as the first transistor and configured to supply a current to a load based on the control signal input to a gate of the second transistor that includes a source connected to ground, the gate connected to the gate of the first transistor, and a drain connected to the load, a voltage regulation unit configured to control a drain voltage of the first transistor according to a drain voltage of the second transistor, a current detector configured to detect a value of a current flowing through the first transistor and output a current according to a detected value, and a controller configured to control a gate voltage of the first transistor and a gate voltage of the second transistor according to the value detected by the current detector so that the current flowing through the first transistor becomes a predetermined value.

The present invention further describes a light-emitting diode drive circuit. In one preferred embodiment, a light-emitting diode drive circuit includes the constant-current circuit as described above, configured to generate a predetermined constant current and supply the constant current to a light-emitting diode.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
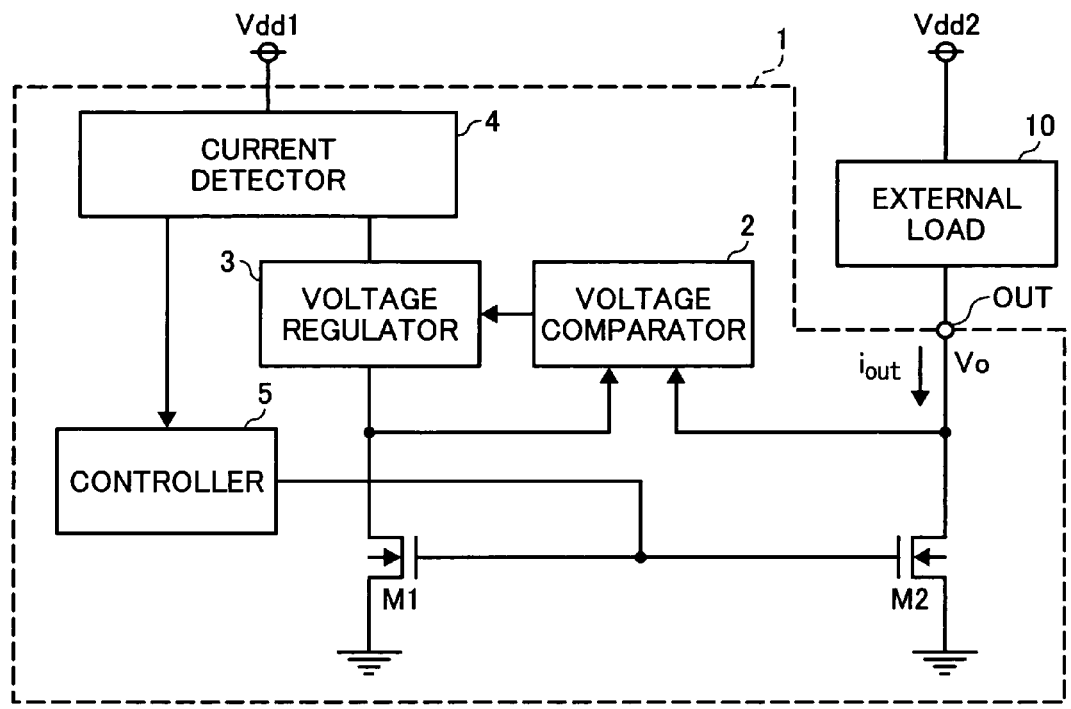
FIG. 1 is a block diagram showing a configuration example of a constant-current circuit of a preferred embodiment according to the present invention.

In describing preferred embodiments illustrated in the drawings, specific terminology is employed solely for the sake of clarity. It should be noted that the present invention is not limited to any preferred embodiment described in the drawings, and the disclosure of this patent specification is not intended to be limited to the specific terminology so selected. It is to be understood that each specific element includes all technical equivalents that operate in a similar manner and achieve a similar result.

Referring now to the drawings, wherein like reference numerals designate identical or corresponding parts throughout the several views, preferred embodiments of the present invention are described.

Referring to FIG. 1, a description is given of a constant-current circuit according to a preferred embodiment of the present invention.

FIG. 1 is a block diagram showing a configuration example of a constant-current circuit of a preferred embodiment according to the present invention. A constant-current circuit 1 shown in FIG. 1 generates a predetermined constant current and supplies the constant current to an external load 10 such as a light-emitting diode (LED) or the like from an output terminal OUT. The constant-current circuit 1 includes NMOS transistors M1 and M2, a voltage comparator 2, a voltage regulator 3, a current detector 4, and a controller 5. In FIG. 1, when the external load 10 is an LED and the constant-current circuit 1 serves as an LED drive device, an anode of the LED is connected to a power supply Vdd2, and a cathode of the LED is connected to the output terminal OUT.

The external load 10 is connected between the power supply Vdd2 and the output terminal OUT. A drain of the NMOS transistor M2 is connected to the output terminal OUT. Each source of the NMOS transistors M1 and M2 is grounded. Gates of the NMOS transistors M1 and M2 are connected to each other and a connection point thereof is controlled by the controller 5. A power supply Vdd1 supplies a current to a drain of the NMOS transistor M1 through the current detector 4 and the voltage regulator 3, and thus the NMOS transistor M1 serves as a current source. The voltage comparator 2 compares drain voltages of the NMOS transistors M1 and M2 and controls the voltage regulator 3 depending on the comparison result, such that the drain voltage of the NMOS transistor M1 becomes the same as the drain voltage of the NMOS transistor M2. The current detector 4 detects a value of the current flowing through the drain of the NMOS transistors M1 and generates a current proportional to the detected current value to output the current to the controller 5. The controller 5 controls each gate voltage of the NMOS transistors M1 and M2 according to the current input from the current detector 4.

Figure 2:
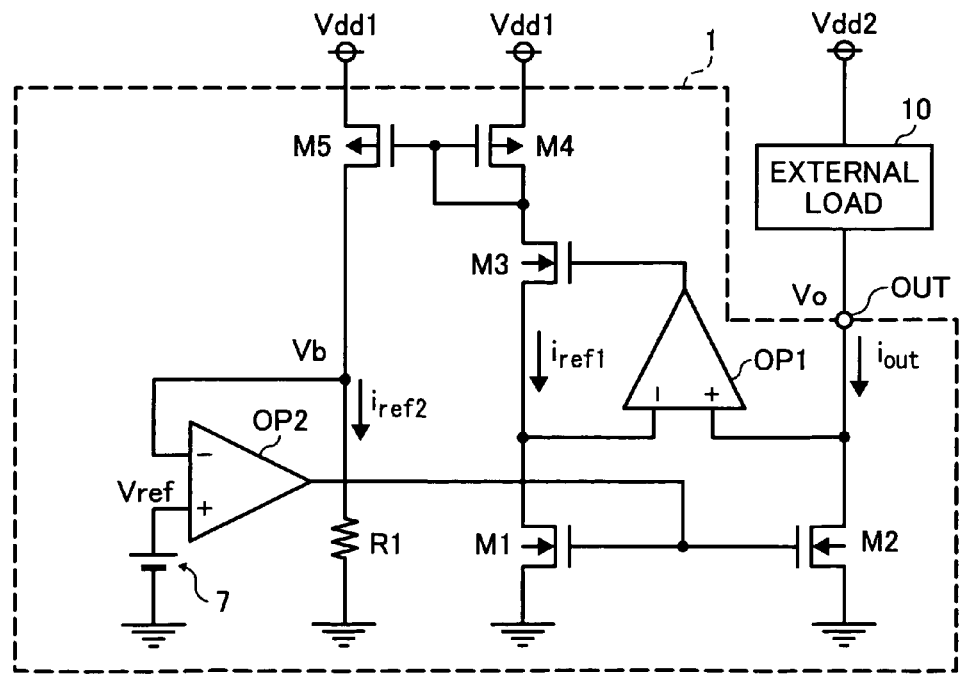
FIG. 2 is a diagram showing example circuitry of the constant-current circuit shown in FIG. 1.

FIG. 2 shows example circuitry of the constant-current circuit 1 shown in FIG. 1. In FIG. 2, the voltage comparator 2 is formed of an error amplifier OP1 and the voltage regulator 3 is formed of an NMOS transistor M3. The current detector 4 is formed of a current mirror circuit including PMOS transistors M4 and M5. The controller 5 is formed of an error amplifier OP2, a reference voltage generator 7 that generates and outputs a predetermined reference voltage Vref, and a resistor R1. The drains of the NMOS transistors M1 and M2 are connected to an inverted input terminal and a non-inverted input terminal of the error amplifier OP1, respectively.

The PMOS transistor M4 and the NMOS transistor M3 are connected in series between the power supply Vdd1 and the drain of the NMOS transistor M1, and a gate of the NMOS transistor M3 is connected to an output terminal of the error amplifier OP1. Gates of the PMOS transistors M4 and M5 are connected to each other, and the connection point thereof is connected to a drain of the PMOS transistor M4. The PMOS transistor M5 and the resistor R1 are connected in series between the power supply Vdd1 and ground, and the connection point thereof is connected to an inverted input terminal of the error amplifier OP2. The reference voltage Vref is input to a non-inverted input terminal of the error amplifier OP2, and an output terminal of the error amplifier OP2 is connected to the connection point of the gates of the NMOS transistors M1 and M2.

The NMOS transistors M1 and M2 serve as first and second transistors, respectively. The voltage comparator 2 and the voltage regulator 3 serve as a voltage regulation unit. The current detector 4 serves as a current detector. The controller 5 serves as a controller. The NMOS transistor M3 serves as a third transistor. The error amplifiers OP1 and OP2 serve as first and second error amplifiers, respectively.

In the above-described configuration, a current $i_{ref1}$ is applied to the drain of the NMOS transistor M1, which serves as the current source, through the PMOS transistor M4 and the NMOS transistor M3, and a current $i_{ref2}$ proportional to the current $i_{ref1}$ is output from a drain of the PMOS transistor M5. An output current $i_{out}$ supplied to the external load 10 from the output terminal OUT is a current obtained by multiplying the current $i_{ref1}$ by a ratio that is determined by transistor sizes of the NMOS transistors M1 and M2. The current $i_{ref2}$ is a current obtained by multiplying the current $i_{ref1}$ by a ratio that is determined by transistor sizes of the PMOS transistors M4 and M5.

The error amplifier OP1 controls a gate voltage of the NMOS transistor M3 such that the drain voltage of the NMOS transistor M1 becomes equal to the drain voltage of the NMOS transistor M2. That is to say, the NMOS transistor M3 adjusts the drain voltage of the NMOS transistor M1 according to a signal output from the error amplifier OP1. The current $i_{ref2}$ output from the PMOS transistor M5 is converted into a voltage Vb with reference to ground by the resistor R1, and the voltage Vb is input to the inverted input terminal of the error amplifier OP2. The error amplifier OP2 controls each gate voltage of the NMOS transistors M1 and M2 such that the voltage Vb becomes equal to the reference voltage Vref.

When a transistor size ratio of the NMOS transistors M1 and M2 is 1:K1 and a transistor size ratio of the PMOS transistors M4 and M5 is 1:K2, wherein K1 and K2 are values of transistor sizes of the NMOS transistor M2 and the PMOS transistor M5, respectively, when transistor sizes of the NMOS transistor M1 and the PMOS transistor M4 is defined as 1, the output current $i_{out}$ is represented by the following equation (1), and a relation between the output current $i_{out}$, the current $i_{ref1}$, and the current $i_{ref2}$ is represented by the following equation (2):

$$i_{out} = K1 \times i_{ref1} \quad (1)$$

$$i_{ref2} = K2 \times i_{ref1} = K2/K1 \times i_{out} \quad (2)$$

When a value of the resistor R1 is r1, the following equation (3) is derived from the equation (2) based on a relation of $i_{ref2}$=Vref/r1, and the following equation (4) is derived from the equation (3):

$$Vref/r1 = K2/K1 \times i_{out} \quad (3)$$

$$i_{out} = Vref/r1 \times K1/K2 \quad (4)$$

From the equation (4), the output current $i_{out}$ supplied to the external load 10 is determined by the reference voltage Vref, the value of the resistor R1, and the transistor size ratios of K1 and K2.

As described above, the drain voltages of the NMOS transistors M1 and M2 are controlled by the error amplifier OP1 and the NMOS transistor M3 so as to become the same value. Thus, even when a voltage Vo of the output terminal OUT fluctuates, generation of systemic error can be avoided, and the predetermined output current $i_{out}$ can be output with high precision.

A lowest drain voltage of the NMOS transistor M2 to operate in a saturation region is now described. When an input voltage range of the error amplifier OP1 and an output voltage range of the error amplifier OP2 are assumed to be sufficient, a condition enabling the NMOS transistor M2 to operate in the saturation region is represented by the following equation (5). In the equation (5), a voltage between the gate and the source, a voltage between the drain and the source, a threshold voltage, and an overdrive voltage of the NMOS transistor M2 are referred to as Vgs2, Vds2, Vthn, and Vov2, respectively:

$$Vds2 \geq Vgs2 - Vthn = Vov2 \quad (5)$$

Figure 7:
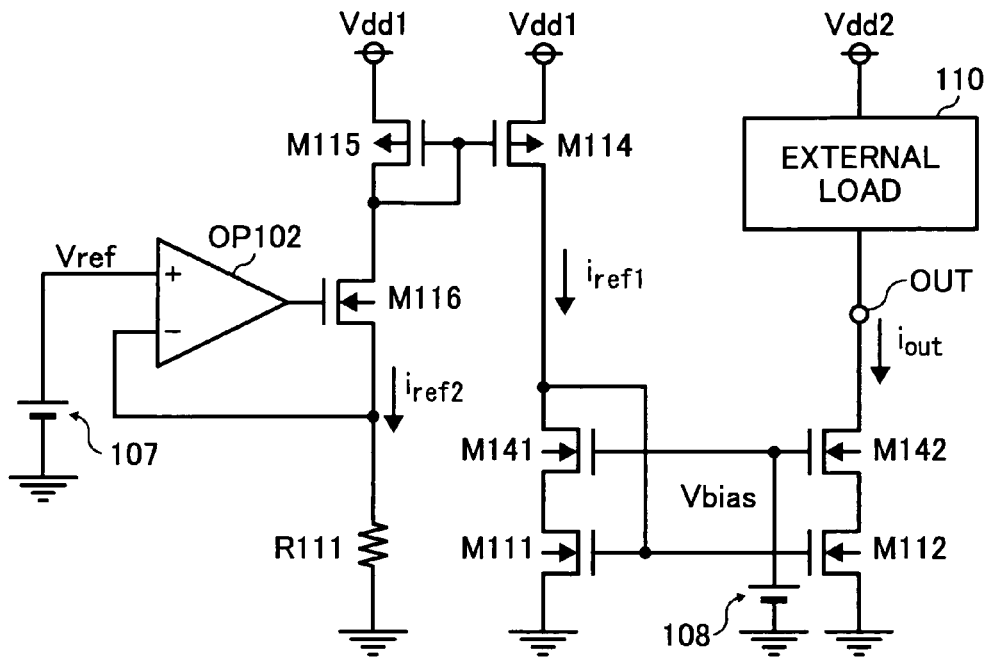
FIG. 7 is a diagram showing an example of a related-art constant-current circuit.
Figure 8:
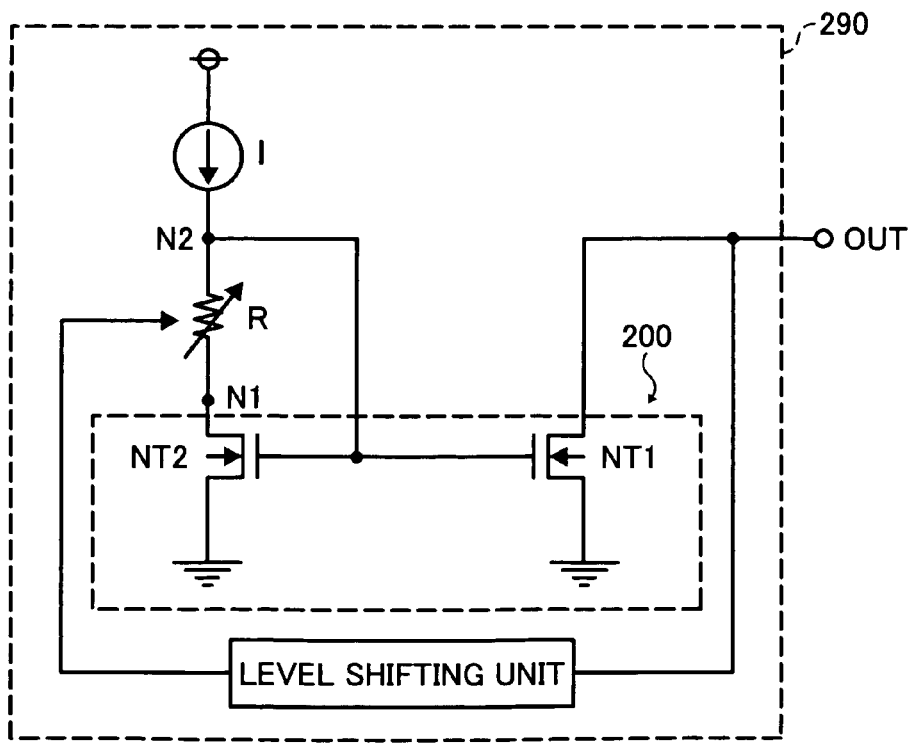
FIG. 8 is a diagram showing another example of a related-art constant-current circuit.

Thus, a lowest voltage of the voltage Vo of the output terminal OUT is the same as the overdrive voltage Vov2 and is lowered to half a lowest voltage of an output terminal of a conventional constant-current circuit as described using the equation (d) with reference to FIG. 7, which shows an example of a related-art constant-current circuit.

Figure 3:
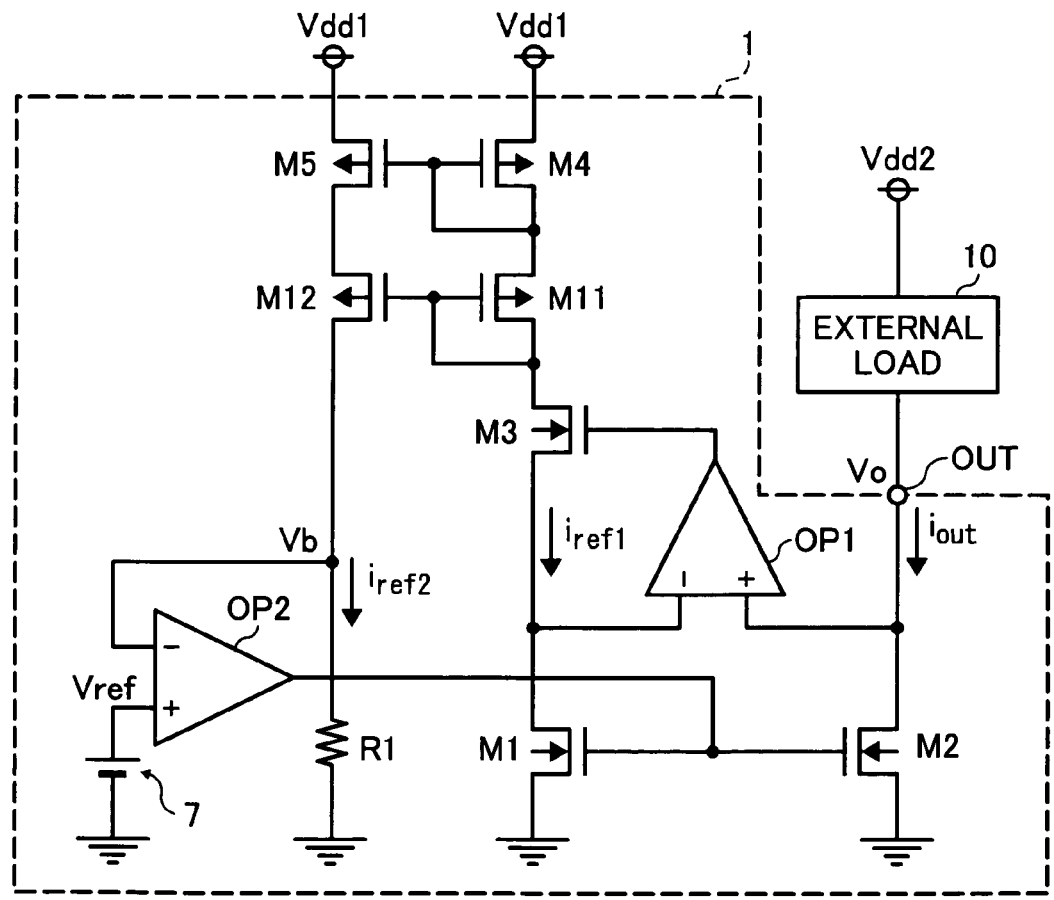
FIG. 3 is a diagram showing other example circuitry of the constant-current circuit shown in FIG. 1.
Figure 4:
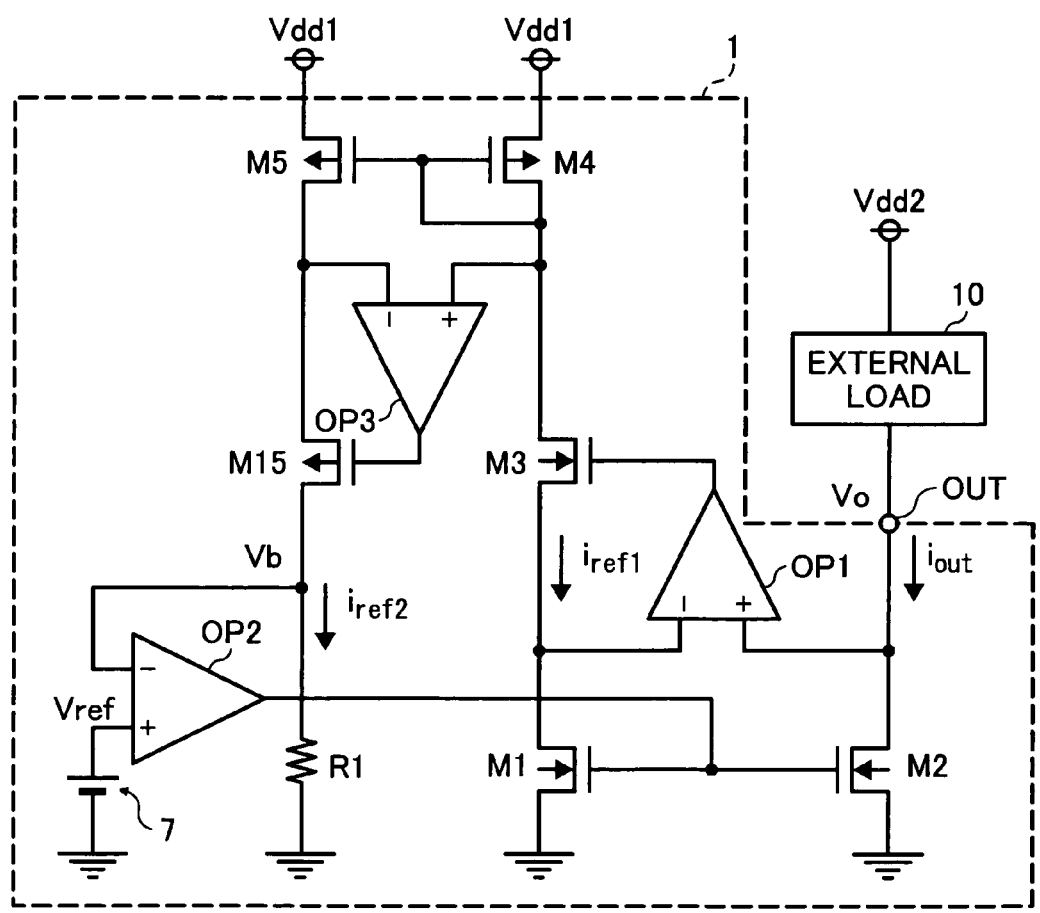
FIG. 4 is a diagram showing other example circuitry of the constant-current circuit shown in FIG. 1.

In FIG. 2, the current mirror circuit formed of the PMOS transistors M4 and M5 can be replaced with a cascode-type current mirror circuit as shown in FIG. 3 or 4.

In FIG. 3, PMOS transistors M11 and M12 are added to the constant-current circuit 1 shown in FIG. 2. The PMOS transistors M11 and M12 are connected between the PMOS transistor M4 and the NMOS transistor M3 and between the PMOS transistor M5 and the resistor R1, respectively. Gates of the PMOS transistors M11 and M12 are connected to each other, and a connection point thereof is connected to a drain of the PMOS transistor M11.

As shown in FIG. 3, the PMOS transistors M4, M5, M11, and M12 form a cascode-type current mirror circuit. When a transistor size ratio between the PMOS transistors M11 and M12 is the same as a transistor size ratio between the PMOS transistors M4 and M5, drain voltages of the PMOS transistors M4 and M5 are controlled to be equal. Thus, an error due to a channel-length modulation effect can be eliminated at the PMOS transistors M4 and M5. Further, a current ratio of the currents $i_{ref1}$ and $i_{ref2}$ is determined by the transistor size ratio between the PMOS transistors M4 and M5. Accordingly, the constant-current circuit 1 shown in FIG. 3 can output the output current $i_{out}$ with higher precision than the constant-current circuit 1 shown in FIG. 2.

In FIG. 4, an error amplifier OP3 and a PMOS transistor M15 are added to the constant-current circuit 1 shown in FIG. 2. The PMOS transistor M15 is connected between the PMOS transistor M5 and the resistor R1. An output terminal, a non-inverted input terminal, and an inverted terminal of the error amplifier OP3 are connected to a gate of the PMOS transistor M15, the drain of the PMOS transistor M4, and the drain of the PMOS transistor M5, respectively.

The PMOS transistors M4, M5, and M15 and the error amplifier OP3 form a cascode-type current mirror circuit. The error amplifier OP3 controls the PMOS transistor M15, such that each voltage of the inverted and non-inverted input terminals of the error amplifier OP3 becomes equal. Thus, the constant-current circuit 1 shown in FIG. 4 has a similar effect to the constant-current circuit 1 shown in FIG. 3. Further, the error amplifier OP3 has an extremely large voltage amplification ratio. As a result, the constant-current circuit 1 shown in FIG. 4 can output the output current $i_{out}$ with still higher precision than the constant-current circuit 1 shown in FIG. 3.

Figure 5:
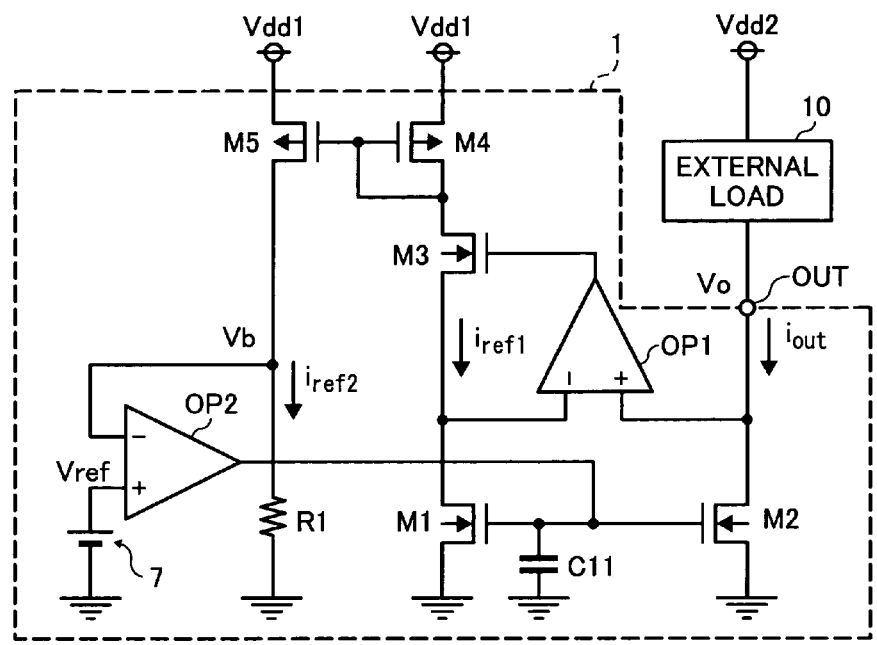
FIG. 5 is a diagram showing other example circuitry of the constant-current circuit shown in FIG. 1.

A capacitor C11 can be added between the connection point of the gates of the NMOS transistors M1 and M2 and ground in the constant-current circuit 1 shown in FIG. 2, 3, or 4. For example, when the capacitor C11 is added to the constant-current circuit 1 shown in FIG. 2, the constant-current circuit 1 with the capacitor C11 is shown in FIG. 5. The capacitor C11 serves as a delay circuit.

Before the constant-current circuit 1 starts to operate, each gate of the NMOS transistors M1 and M2 is fixed to ground by the error amplifier OP2. When the constant-current circuit 1 starts operating, each gate voltage of the NMOS transistors M1 and M2 rises to a predetermined value concurrently with the start of operation of the constant-current circuit 1. A rising speed of each gate voltage of the NMOS transistors M1 and M2 is decelerated due to a delay time determined by an output resistor of the error amplifier OP2 and the capacitor C11. As a result, an overshoot that occurs at the output terminal OUT in the operation start of the constant-current circuit 1 can be eliminated. Thus, a problem caused in the external load 10 in the operation start of the constant-current circuit 1 due to large application of the output current $i_{out}$ to the external load 10 can be avoided.

Figure 6:
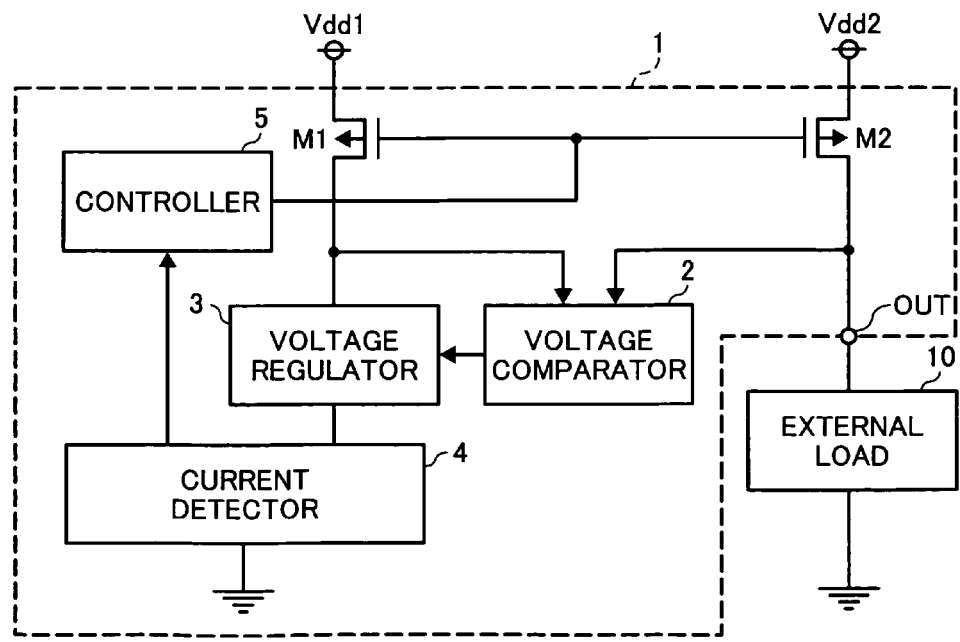
FIG. 6 is a block diagram showing another configuration example of a constant-current circuit of a preferred embodiment according to the present invention.

In the description above, the preferred embodiment is described with an NMOS transistor as an output transistor. However, it should be noted that the present invention does not limit the output transistor to the NMOS transistor, and alternatively a PMOS transistor can be employed as the output transistor. When the PMOS transistor is employed, the constant-current circuit 1 shown in FIG. 1 is changed to an example shown in FIG. 6. In FIG. 6, when the external load 10 is an LED and the constant-current circuit 1 serves as an LED drive circuit, a cathode and an anode of the LED are connected to ground and the output terminal OUT, respectively.

In FIGS. 2, 3, and 4, the example circuitry with the NMOS transistor M3 of an enhancement-type NMOS transistor is shown. However, it should be noted that a depression-type NMOS transistor can also be employed for the NMOS transistor M3. When a depression-type NMOS transistor is employed, the drain voltage of the NMOS transistor M1 can be further increased. Thus, the drain voltage of the NMOS transistor M2 can also be increased, improving versatility of the constant-current circuit 1.

As described above, the constant-current circuit according to the preferred embodiment does not require the NMOS transistors M141 and M142, which serve as a cascode element, employed in the conventional constant-current circuit shown in FIG. 7. As a result, a chip area of the constant-current circuit can be substantially reduced. Furthermore, the constant-current circuit can output an output current with high precision without systemic error, which is generated due to voltage fluctuation of the output terminal OUT. Moreover, power consumption of an output transistor can be reduced to half that of a conventional constant-current circuit by lowering a lowest voltage of the output terminal OUT to half the lowest voltage of the output terminal of the conventional constant-current circuit.

In the preferred embodiment, supply voltages of the power supplies Vdd1 and Vdd2 can be equal or different. The constant-current circuit 1 can be integrated onto one integrated-circuit with a power supply circuit for generating the supply voltage of the power supply Vdd1, a power supply circuit for generating the supply voltage of the power supply Vdd2, or both the power supply circuits for generating the supply voltages of the power supplies Vdd1 and Vdd2.

It should be noted that the above-described embodiments are merely illustrative, and numerous additional modifications and variations are possible in light of the above teachings. For example, elements and/or features of different illustrative and preferred embodiments herein may be combined with each other and/or substituted for each other within the scope of this disclosure. It is therefore to be understood that the disclosure of this patent specification may be practiced otherwise than as specifically described herein.

What is claimed is:

1. A constant-current circuit, comprising:
   a first transistor formed of a MOS transistor and configured to supply a current based on a control signal input to a gate of the first transistor to serve as a current source;
   a second transistor formed of a MOS transistor having the same conductivity as the first transistor and configured to supply a current to a load based on the control signal input to a gate of the second transistor that includes a source connected to ground, the gate connected to the gate of the first transistor, and a drain connected to the load;
   a voltage regulation unit configured to control a drain voltage of the first transistor according to a drain voltage of the second transistor;
   a current detector configured to detect a value of a current flowing through the first transistor and output a current according to a detected value;
   a controller configured to control a gate voltage of the first transistor and a gate voltage of the second transistor according to the value detected by the current detector so that the current flowing through the first transistor becomes a predetermined value, wherein the controller comprises an error amplifier; and
   a delay circuit configured to delay a voltage output from the controller for a predetermined time and output a delayed voltage to the gates of the first and second transistors.

2. The constant-current circuit according to claim 1, wherein:
   one terminal of the delay circuit is connected to a connection point of the gates of the first and second transistors, and
   wherein the delay circuit comprises a capacitor that is charged with the voltage output from the controller.

3. The constant-current circuit according to claim 1, wherein the first transistor, the second transistor, the voltage regulation unit, the current detector, the controller, and the delay circuit are integrated onto one integrated circuit.

4. The constant-current circuit according to claim 1, wherein the voltage regulation unit comprises:
   a comparator configured to compare the drain voltages of the first and second transistors and output a signal representing a comparison result; and
   a voltage regulator configured to control the drain voltage of the first transistor according to the signal representing the comparison result from the comparator so that the drain voltage of the first transistor becomes equal to the drain voltage of the second transistor.

5. The constant-current circuit according to claim 4, wherein:
   the comparator is formed of another error amplifier and each drain voltage of the first and second transistors is input to each corresponding input terminal of the another error amplifier, and
   wherein the voltage regulator is comprised of a third transistor formed of a MOS transistor to which a drain of the first transistor is connected in series and an output signal of the another error amplifier is input to a gate of the third transistor.

6. The constant-current circuit according to claim 5, wherein the third transistor has the same conductivity as the first transistor and adjusts the drain voltage of the first transistor according to a signal output from the another error amplifier.

7. The constant-current circuit according to claim 1, wherein:
   the current detector is formed of a current mirror circuit that generates and outputs a current proportional to a current applied to the first transistor, and
   wherein the controller controls the gate voltages of the first and second transistors so that the current input to the controller from the current mirror circuit becomes a predetermined value.

8. The constant-current circuit according to claim 7, wherein the controller further comprises:
   a resistor that converts the current input to the controller from the current mirror circuit into a voltage,
   wherein the error amplifier is configured to control the gate voltages of the first and second transistors so that the voltage converted by the resistor becomes a predetermined value.

9. The constant-current circuit according to claim 7, wherein the current mirror circuit is a cascode-type current mirror circuit.

10. A light-emitting diode drive circuit comprising a constant-current circuit configured to generate a predetermined constant current and supply the constant current to a light-emitting diode, wherein the constant-current circuit includes:
   a first transistor formed of a MOS transistor and configured to supply a current based on a control signal input to a gate of the first transistor to serve as a current source;
   a second transistor formed of a MOS transistor having the same conductivity as the first transistor and configured to supply a current to a load based on the control signal input to a gate of the second transistor that includes a source connected to ground, the gate connected to the gate of the first transistor, and a drain connected to the load;
   a voltage regulation unit configured to control a drain voltage of the first transistor according to a drain voltage of the second transistor;
   a current detector configured to detect a value of a current flowing through the first transistor and output a current according to a detected value;
   a controller configured to control a gate voltage of the first transistor and a gate voltage of the second transistor according to the value detected by the current detector so that the current flowing through the first transistor becomes a predetermined value, wherein the controller comprises an error amplifier; and
   a delay circuit configured to delay a voltage output from the controller for a predetermined time and output a delayed voltage to the gates of the first and second transistors.

11. The light-emitting diode drive circuit according to claim 10, wherein:
   one terminal of the delay circuit is connected to a connection point of the gates of the first and second transistors, and
   wherein the delay circuit comprises a capacitor that is charged with the voltage output from the controller.

12. The light-emitting diode drive circuit according to claim 10, wherein the voltage regulation unit comprises:
   a comparator configured to compare the drain voltages of the first and second transistors and output a signal representing a comparison result; and
   a voltage regulator configured to control the drain voltage of the first transistor according to the signal representing the comparison result from the comparator so that the drain voltage of the first transistor becomes equal to the drain voltage of the second transistor.

13. The light-emitting diode drive circuit according to claim 12, wherein:
   the comparator is formed of another error amplifier and each drain voltage of the first and second transistors is input to each corresponding input terminal of the another error amplifier, and
   wherein the voltage regulator is comprised of a third transistor formed of a MOS transistor to which a drain of the first transistor is connected in series and an output signal of the another error amplifier is input to a gate of the third transistor.

14. The light-emitting diode drive circuit according to claim 13, wherein the third transistor has the same conductivity as the first transistor and adjusts the drain voltage of the first transistor according to a signal output from the another error amplifier.

15. The light-emitting diode drive circuit according to claim 10, wherein:
   the current detector is formed of a current mirror circuit that generates and outputs a current proportional to a current applied to the first transistor, and
   wherein the controller controls the gate voltages of the first and second transistors so that the current input to the controller from the current mirror circuit becomes a predetermined value.

16. The light-emitting diode drive circuit according to claim 15, wherein the controller further comprises:
   a resistor that converts the current input to the controller from the current mirror circuit into a voltage,
   wherein the error amplifier is configured to control the gate voltages of the first and second transistors so that the voltage converted by the resistor becomes a predetermined value.

17. The light-emitting diode drive circuit according to claim 15, wherein the current mirror circuit is a cascode-type current mirror circuit.

18. An external load drive circuit comprising a constant-current circuit configured to generate a predetermined constant current and supply the constant current to a light-emitting diode, wherein the constant-current circuit includes:
   a first transistor formed of a MOS transistor and configured to supply a current based on a control signal input to a gate of the first transistor to serve as a current source;
   a second transistor formed of a MOS transistor having the same conductivity as the first transistor and configured to supply a current to a load based on the control signal input to a gate of the second transistor that includes a source connected to ground, the gate connected to the gate of the first transistor, and a drain connected to the load;
   a voltage regulation unit configured to control a drain voltage of the first transistor according to a drain voltage of the second transistor;
   a current detector configured to detect a value of a current flowing through the first transistor and output a current according to a detected value;
   a controller configured to control a gate voltage of the first transistor and a gate voltage of the second transistor according to the value detected by the current detector so that the current flowing through the first transistor becomes a predetermined value, wherein the controller comprises an error amplifier; and
   a delay circuit configured to delay a voltage output from the controller for a predetermined time and output a delayed voltage to the gates of the first and second transistors.

19. The external load drive circuit according to claim 18, wherein:

one terminal of the delay circuit is connected to a connection point of the gates of the first and second transistors, and wherein the delay circuit comprises a capacitor that is charged with the voltage output from the controller.

20. The external load drive circuit according to claim 18, wherein the voltage regulation unit comprises:

a comparator configured to compare the drain voltages of the first and second transistors and output a signal representing a comparison result; and a voltage regulator configured to control the drain voltage of the first transistor according to the signal representing the comparison result from the comparator so that the drain voltage of the first transistor becomes equal to the drain voltage of the second transistor.

* * * * *